United States Patent Office 3,187,005
Patented June 1, 1965

3,187,005

CARBOXY AND CARBOXYMETHYL GLYCOLURILS AND PROCESS

Frank B. Slezak, Painesville, Ohio, assignor to Diamond Alkali Company, Cleveland, Ohio, a corporation of Delaware No Drawing. Filed July 7, 1961, Ser. No. 122,391
10 Claims. (Cl. 260—309.7)

This invention relates to novel carboxy and carboxymethyl substituted glycolurils and novel N-halogenated analogs of these compounds and to their preparation and application.

More specifically, this invention relates to novel polysubstituted glycolurils of the structure:

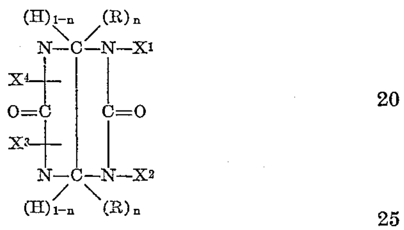

wherein R is selected from the group consisting of $COOC_2H_5$ and COONa; $X^1$ is selected from the group consisting of halogen, $CH_2COOH$, $CH_2COOC_2H_5$ and $CH_2COONa$; $X^2$ is selected from the group consisting of H and halogen; $X^3$ and $X^4$ are selected from the group consisting of H, halogen and $CH_2COOH$; and $n$ is a number from 0 to 1, inclusive, with $n$ being 1 when $X^1$ is halogen and being 0 when $X^1$ is other than halogen.

Specific illustrative compounds embodying this invention are:

Disodium tetrachloroglycoluril-3a,6a-dicarboxylate

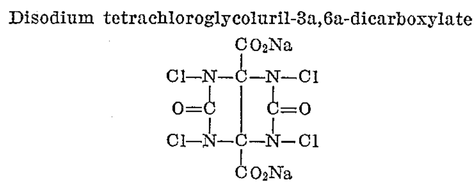

Diethyl tetrachloroglycoluril-3a,6a-dicarboxylate

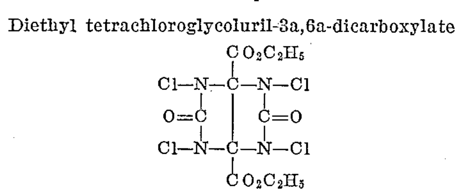

1-(carboxymethyl)glycoluril

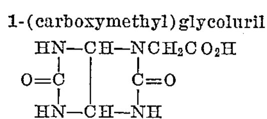

1-(carboxymethyl)trichloroglycoluril

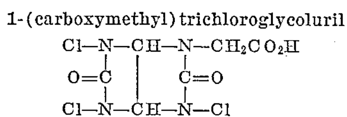

Sodium salt of 1-(carboxymethyl)trichloroglycoluril

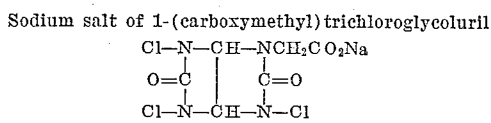

1-(carbethoxymethyl)glycoluril

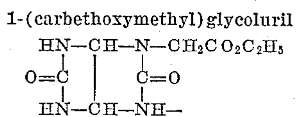

1-(carbethoxymethyl)monochloroglycoluril

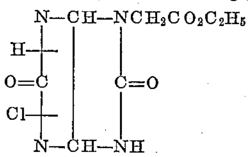

1-(carbethoxymethyl)dichloroglycoluril

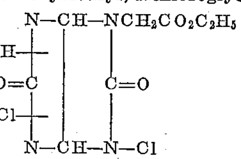

1-(carbethoxymethyl)trichloroglycoluril

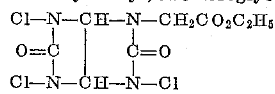

1,4-bis(carboxymethyl)glycoluril

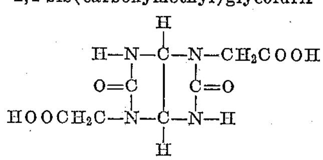

1,6-bis(carboxymethyl)glycoluril

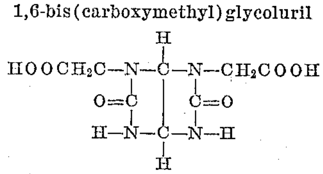

The N-chlorinated glycolurils of this invention and, in particular, diethyl tetrachloroglycolurial-3a,6a-dicarboxylate are characterized by a singular activity as sanitizers, i.e., in applications wherein the compound employed reduces the number of microorganisms on an inanimate object or surface to a safe level, and in disinfecting and bactericidal applications generally as well as in various biologically active compositions such as fungicides and insecticides. Of particular interest is the sanitizing activity of compounds of this invention which is further enhanced by the fact that compounds of this invention generally are solids and thus inherently provide a significant improvement over many prior conventional sanitizing agents including the well known and widely used sodium hypochlorite solution. Moreover, the fact that compounds of this invention are solids provides increased convenience by way of easier handling, reduced likelihood of incurring damage by breakage, freezing or spilling.

The novel carboxy and carboxymethyl glycolurils of this invention are useful in preparing the novel N-halogenated analogs of these compounds. The carboxy and carboxymethyl glycolurils may be esterified with compounds such as 2-ethylhexyl alcohol to form compounds use as lubricants. Also the bis(carboxymethyl)glycolurils may be employed in high temperature polymers and, when coupled with a compound such as, for example, 2-ethylhexyl alcohol, form excellent lubricants for high pressure applications.

Preparation of diethylglycoluril-3a,6a-dicarboxylate has been reported, e.g., R. Anschutz and H. Geldermann, Ann. 261, 131 (1891); and H. Biltz and G. Schiemann, J. Prakt. Chem. [2], 113, 77–100 (1926). Disodium glycoluril-3a,6a-dicarboxylate may be prepared by reacting the diethyl compound with an aqueous alkaline solution, e.g., sodium hydroxide to hydrolyze the ester groups. The corresponding novel halogenated compounds may be prepared by halogenating aqueous suspensions of the respective diethyl or disodium compounds while adding an aqueous caustic solution to maintain the pH of the reaction mixture in the range of 7–8.5.

The novel carboxymethyl glycolurils may be prepared by reacting glyoxalmonoureide with approximately an equal molar amount of either hydantoic acid or its esters, such as ethyl hydantoate, in an aqueous acid solution. The compound 1-(carbethoxymethylglycoluril may be prepared either by esterification of 1-(carboxymethyl)-glycoluril or by reacting glyoxalmonoureide with ethyl hydantoate in ethanol. In a related process the reaction of about 1 mole of glyoxal with approximately 2 moles of hydantoic acid in an aqueous acid solution produces bis-(carboxymethyl)glycoluril. The products may be purified by a recrystallization from an appropriate solvent, e.g., water, ethanol, and the like.

The N-halogenated carboxy and carboxymethyl substituted glycolurils generally may be prepared by halogenating a carboxy or carboxymethyl substituted glycoluril suspended in water while adding an aqueous alkaline solution, e.g., NaOH, to maintain the pH of the reaction mixture preferably in the range of 7–9.

One of the most advantageous applications of compounds of this invention is in compositions useful in sterilizing and bacterial toxicant applications, hence, it will be understood that compounds of this invention are useful when mixed with water and, in certain instances, with other liquids to yield materials suitable for sterilizing and disinfecting such as in the treatment of food containers, e.g., metal and other type containers used in the transport of food products such as milk, cream and the like as well as in oxidizing-type detergents for use in hospitals and other places such as hotels and restaurants for dishwashing and the like where a product having a high available chlorine content is desirable.

Accordingly, in view of the variety of advantageous applications of compounds of this invention, it will be understood that the novel N-halogenated glycolurils may be employed as ingredients in compositions which also contain a major or minor, although usually a major proportion, of other substances preferably readily water soluble, such as alkali metal salts, alkaline earth metal salts, and/or other alkali salts such as alkali metal phosphates, e.g., sodium or potassium phosphates, and the like. The alkaline materials serve to provide a desirable pH at which the compounds are often more soluble and, in many instances, also provides advantageous detergent or washing properties in solution.

In this connection, it will be appreciated that various alkaline phosphates including alkali metal phosphates and alkaline earth metal phosphates useful in detergent compositions, such as sodium tripolyphosphates, sodium pyrophosphates, sodium triphosphates, and the like may be incorporated into compositions advantageously including also one or more compounds of this invention.

In addition to these detergent ingredients, it will be further understood that various organic wetting agents, such as alkyl aryl sulfonates, e.g., sodium dodecyl benzyl sulfonate, or other wetting agents or surface active materials may be included as well as soaps, fillers, abrasives and water softening agents of organic or inorganic type incorporated as desired to provide specific properties required in a particular application.

Further, it will be appreciated that compositions of this invention particularly adapted in the sterilization, disinfectant and detergent applications may either be dry particulate materials ranging from finely divided powders to granular materials of increased particle size to pastes and liquid slurries and/or solutions, depending on the application intended.

It would be appreciated, of course, that in a variety of applications contemplated for compounds of this invention the proportions of these compounds with respect to the other ingredients employed can be varied. However, it may be stated that in many applications the novel N-halogenated glycolurils of this invention desirably will comprise minor amounts of about 1% by weight or less up to about 10% based on the mole composition employed. Frequently, these compounds are employed in amounts constituting a small, but effective, quantity appreciably less than 1% up to a much greater proportion dictated by a number of factors including cost, application, equipment and other considerations, e.g., as high as 100% in certain instances where the pure material is advantageously utilized.

The N-halogenated glycolurils of this invention having a high available chlorine content are useful in sanitizing or disinfecting the water in swimming pools. These compounds, due to the presence of carboxy and/or carboxymethyl substituents are only slightly soluble in water.

The majority of swimming pool disinfectants, being quite soluble in water, must be introduced into the pool by means of metering devices or other costly and cumbersome control systems. The limited solubility of the compounds of this invention causes them to be self-regulating with regard to their dissolution in water. One way in which the N-halogenated carboxy and/or carboxymethyl substituted glycolurils may be introduced into the water is by passing the make-up and recirculating water flowing into the pool through a bed of the glycoluril. The glycoluril may also be formed into a block or rod which can be immersed in the water. In either application the water will gradually dissolve the glycoluril, thus maintaining a desired level of chlorine in the pool.

The N-halogenated glycolurils of this invention are also effective as pesticides for controlling fungi, bacteria, and insects.

While it is possible to apply the compounds of the present invention in undiluted form to the plant or other material to be protected, it is frequently desirable to apply the novel glycolurils in admixture with either solid or liquid inert, pesticidal adjuvants. Thus, the glycolurils can be applied to the plants for fungicidal purposes, for example, by spraying them with aqueous or organic solvent dispersions of the glycolurils. The choice of an appropriate solvent is determined largely by the concentration of active ingredient which it is desired to employ, by the volatility required in the solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, petroleum, naphtha; chlorinated hydrocarbons, such as carbon tetrachloride, chloroform, trichloroethylene, perchlorethylene; and esters such as ethyl acetate, amyl acetate and butyl acetate.

The glycolurils can also be applied to plants and other materials along with inert solid fungicidal adjuvants or carriers such as talc, pyrophyllite, Attaclay, kieselguhr, chalk, diatomaceous earth, lime, calcium carbonate, bentonite and fuller's earth.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, fatty acid esters of polyhydric alcohols, ethylene oxide addition products of such esters; sodium alkyl benzene sulfonates having 14 to 18 carbon atoms, and soaps, e.g., sodium stearate and sodium oleate.

The solid and liquid formulations can be prepared in any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20 mesh Tyler sieve. A dust which passes through a 200 mesh Tyler sieve also is satisfactory.

For dusting purposes, preferably formulations are employed in which the active ingredient is present in an amount of 5% to 50% of the total by weight. However, concentrations outside this range are operative and compositions containing 1% to 99% of active ingredient by weight are contemplated, the remainder being carrier and/or any other additive or adjuvant material which may be desired. It is often advantageous to add small percentages of surface active agents, e.g., 0.5% to 1% of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or nonaqueous medium. Desirably, 0.5% to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The novel N-halogenated glycolurils of the present invention can be employed in compositions containing other pesticides, more especially fungicides, insecticides and bactericides, e.g., phenothiazine, pyrethrum, rotenone, DDT, etc.

The term "available chlorine," as employed throughout the specification and claims, is intended to refer to that chlorine which is attached directly to nitrogen or oxygen. Since each such positively charged chlorine undergoes a 2-electron change upon reaction, it behaves as if it were $Cl_2$ and, therefore, the amount of effective chlorine available for reaction is $2xCl^+$. The "percent available chlorine" of such a compound thus becomes twice the weight percent of chlorine attached to nitrogen or oxygen.

In order that those skilled in the art may more completely understand the present invention and the preferred methods by which the same may be carried into effect, the following specific examples are offered.

EXAMPLE I

*Preparation of diethyl tetrachloroglycoluril-3a,6a-dicarboxylate*

A 400 ml. beaker is furnished with a mechanical stirrer, a gas dispersion tube, an addition funnel and the electrodes of a Beckman model H–2 pH meter. Diethyl glycoluril-3a,6a-dicarboxylate (2.86 g., 0.01 mole) suspended in 200 ml. of water is treated with chlorine (4 g.) over a two-hour period while 1 N sodium hydroxide is added at such a rate as to maintain the mixture at about a pH of 7. The white solid obtained after filtration and drying weighs 3.7 g. (88%) and contains 64.4% available chlorine (67% is theoretical). A sample recrystallized from benzene has M.P. 162°–163° C. Chemical analysis indicates preparation of the desired $C_{10}H_{10}Cl_4N_4O_6$ and is as follows:

| Element | Percent calculated | Percent actual |
|---|---|---|
| C | 28.32 | 29.17 |
| H | 2.38 | 2.53 |
| Cl | 33.44 | 31.6 |
| N | 13.21 | 13.3 |

Infrared analysis supports the assigned structure.

EXAMPLE II

*Preparation of disodium glycoluril-3a,6a-dicarboxylate*

Diethyl glycoluril-3a,6a-dicarboxylate (0.715 g.) is treated with 1.084 N sodium hydroxide (4.61 ml.), an amount sufficient to hydrolyze the ester groups, and the resulting solid is filtered, washed and dried to give 0.523 g. of white solid. Chemical analysis indicates preparation of the desired $C_6H_4N_4O_6Na_2$ and is as follows:

| Element | Percent calculated | Percent actual |
|---|---|---|
| C | 26.29 | 25.73 |
| H | 1.47 | 2.01 |
| N | 20.44 | 19.15 |
| Na | 16.8 | 16.1 |

Infrared analysis supports the assigned structure.

EXAMPLE III

*Preparation of disodium tetrachloroglycoluril-3a,6a-dicarboxylate*

A 600 ml. beaker is furnished with a mechanical stirrer, a gas dispersion tube, an addition funnel and the electrodes of a Beckman model H–2 pH meter. Disodium glycoluril-3a,6a-dicarboxylate (3.68 g., 0.013 mole) in 200 ml. of water is treated with chlorine (4.5 g.) over a 45 minute period while 1 N sodium hydroxide solution is added at such a rate as to maintain the solution at about a pH of 8.5. The somewhat cloudy solution is filtered and the filtrate is evaporated to dryness under aspirator vacuum and on a 40°–50° C. water bath. After washing, a mixture composed of disodium tetrachloroglycoluril-3a,6a-dicarboxylate and sodium chloride weighing 2.7 g. and containing 36.8% available chlorine is obtained.

EXAMPLE IV

*Preparation of 1-(carboxymethyl)glycoluril*

Glyoxalmonoureide (23.5 g., 0.2 mole), hydantoic acid (25 g., 0.21 mole), water (80 ml.) and concentrated HCl (10 ml.) are boiled gently in a 250 ml. Erlenmeyer flask for 10–15 minutes. The resulting solution is allowed to stand, and after cooling the resulting solid is filtered off and dried to give 21 g. of crude solid. Concentration of the filtrate to about half its volume with the aid of vacuum and a 40°–50° C. water bath gives an additional 10 g. of solid. The combined solids (31 g., 78%) recrystallized from 90 ml. of water with the aid of decolorizing carbon gives 17 g. (43%) of 1-(carboxymethyl)glycoluril, M.P. 221° C. An additional recrystallization raises the M.P. to 226° C. Chemical analysis indicates preparation of the desired $C_6H_8N_4O_4$ and is as follows:

| Element | Percent calculated | Percent actual |
|---|---|---|
| C | 36.0 | 36.2 |
| H | 4.0 | 4.1 |
| N | 28.0 | 28.2 |

Infrared analysis supports the assigned structure.

The use of ethyl hydantoate in place of hydantoic acid gives a similar yield of the compound.

EXAMPLE V

*Chlorination of 1-(carboxymethyl)glycoluril*

A 250 ml. beaker is furnished with a mechanical stirrer, a gas dispersion tube and the electrodes of a Beckman model H–2 pH meter. 1-(carboxymethyl)glycoluril (2.0 g., 0.01 mole) is dissolved in about 200 ml. of water and chlorine (3 g.) is passed in over a 20 minute period. The initial pH of the mixture is 2.3 and at the end of the chlorination it is 0.8. The clear solution is evaporated to dryness on a 30°–40° C. water bath and under aspirator vacuum. The yellowish solid weighs 3.1 g. and contains 11.3% available chlorine.

EXAMPLE VI

*Preparation of the sodium salt of 1-(carboxymethyl)trichloroglycoluril*

A 600 ml. beaker is furnished with a mechanical stirrer, a gas dispersion tube, an addition funnel and the electrodes of a Beckman model H–2 pH meter. 1-(carboxymethyl)-glycoluril (10 g., 0.05 mole) suspended in water (300 ml.) is treated with chlorine (12 g.) over a 1.5 hour period while 3 N sodium hydroxide is added at such a rate as to keep the pH of the mixture in the range 8–8.5. The resulting solution is concentrated to 20–25 ml. on a 30°–40° C. water bath under aspirator vacuum. Upon cooling and filtration, 7 g. of white solid containing 5% available chlorine is obtained. Evaporation of the filtrate to dryness gives 10.7 g. of white solid containing 38.6% available chlorine.

EXAMPLE VII

*Preparation of 1-(carbethoxymethyl)glycoluril*

1-(carboxymethyl)glycoluril (10 g., 0.05 mole), absolute ethyl alcohol (300 ml.), benzene (50 ml.) and concentrated sulfuric acid (1 g.) are refluxed 20 hours in a 500 ml. flask equipped with a water trap. After cooling and filtration, 9.4 g. (84%) of the white solid 1-(carbethoxymethyl)glycoluril, M.P. 217°–218° C., is obtained. Chemical analysis indicates preparation of the desired $C_8H_{12}N_4O_4$ and is as follows:

| Element | Percent calculated | Percent actual |
|---|---|---|
| C | 42.2 | 42.2 |
| H | 5.3 | 5.4 |
| N | 24.6 | 24.3 |

Infrared analysis supports the assigned structure.

Reaction of glyoxalmonoureide and ethyl hydantoate in absolute ethyl alcohol and in the presence of concentrated HCl gives 1-(carbethoxymethyl)glycoluril in 41% overall yield after recrystallization from ethanol.

EXAMPLE VIII

*Chlorination of 1-(carbethoxymethyl)glycoluril*

A 250 ml. beaker is furnished with a mechanical stirrer, a gas dispersion tube, an addition funnel and the electrodes of a Beckman model H–2 pH meter. 1-(carbethoxymethyl)glycoluril (4.6 g., 0.02 mole) suspended in 100 ml. of water is treated with chlorine (7 g.) over a 40-minute period while 1 N sodium hydroxide is added at such a rate as to maintain the pH in a range of 7–9. The resulting product is a water insoluble thick white gum. The water is decanted off, the gum dissolved in 250 ml. of chloroform and the solution filtered to remove sodium chloride. Exaporation of the chloroform leaves a white gum containing 41.6% available chlorine.

The above procedure is repeated and produces a gum containing 25.7% available chlorine.

The theoretical available chlorine contents of chlorinated 1-(carbethoxymethyl)glycolurils are 1-(carbethoxymethyl)monochloroglycoluril 27.0%, 1-(carbethoxymethyl)dichloroglycoluril 47.8%.

Infrared analysis supports the structures assigned for 1-(carbethoxymethyl)monochloroglycoluril and 1-(carbethoxymethyl)dichloroglycoluril.

EXAMPLE IX

*Preparation of 1,4 (and/or 1,6-) bis-(carboxymethyl)glycoluril*

Commercial 30% glyoxal solution (20 g. (6 g., 0.1 mole glyoxal)), hydantoic acid (25 g., 0.21 mole), water (30 ml.) and concentrated HCl (5 ml.) are boiled gently in a 125 ml. Erlenmeyer flask for about 10 minutes. The resulting dark solution is allowed to cool, the precipitated solid filtered off and recrystallized from 140 ml. of water with the aid of decolorizing charcoal to give 3.6 g. (14%) of a mixture of 1,4-bis(carboxymethyl)glycoluril and 1,6-bis(carboxymethyl)glycoluril, M.P. 257° C. dec. Chemical analysis indicates preparation of the desired $$C_8H_{10}N_4O_6$$

and is as follows:

| Element | Percent calculated | Percent actual |
|---|---|---|
| C | 37.2 | 37.1 |
| H | 3.9 | 3.8 |
| N | 21.7 | 21.7 |

Infrared analysis supports the assigned structures.

EXAMPLE X

Test chemicals are examined for ability to inhibit the growth of four bacterial species, *Erwinia amylovora* (*E.a.*), *Xanthomonas phaseoli* (*X.p.*), *Micrococcus pyogenes* var. *aureus* (*M.a.*), *Escherichia coli* (*E.c.*), at various dosages. A formulation containing 0.1 gram of the test chemical, 4 ml. acetone, 2 ml. stock emulsifier solution (0.5% Triton X–155 in water by volume) and 74 ml. distilled water (total volume 80 ml., concentration of toxicant 1250 p.p.m.) is diluted without maintaining the concentration of the emulsifier or solvent. The first two and fourth above named test species are Gram negative rods, the third species is Gram positive. They are all cultures on nutrient agar slants except *X. phaseoli* which is grown on potato dextrose agar. The cultures used for tests are subcultured for two sequential 24-hour periods to insure uniform test populations. Bacterial suspensions are made from the second subculture in the culture tube by addition of distilled water and gentle agitation after which they are filtered through double layers of cheesecloth and adjusted to standard concentrations by turbimetric measurement. Each of four test tubes arranged in a rack receive one ml. of the test formulation. After the test formulations have been measured into a test tube, 3½ ml. of distilled water and ½ ml. of bacterial suspension for each respective test organism is added to each test tube. The medication tubes are then set aside at room temperature for four hours. After this exposure period transfers are made by means of a standard four mm. platinum loop to 7 ml. of sterile broth into test tubes arranged in racks similar to those for the medication tubes. The broth tubes are then incubated for 48 hours at 29° to 31° C. at which time growth is measured by use of a Bausch & Lomb spectronic "20" direct reading colorimeter. A reading is recorded for each test tube after shaking. Usually three replicates of each organism serve as controls. Calculations are made on percent of the mean check readings. This figure subtracted from 100 gives percent control as compared to checks. Dosages and percent control are given in Table I.

TABLE I

| Compound | Dosage in p.p.m. | Percent control | | | |
|---|---|---|---|---|---|
| | | *E.a.* | *X.p.* | *M.a.* | *E.c.* |
| 1-(carboxymethyl)glycoluril | 250 | 28 | 8 | 36 | 48 |
| Sodium salt of 1-(carboxymethyl) trichloroglycoluril | 250 | 60 | 23 | 71 | 30 |
| 1-(carbethoxymethyl)glycoluril | 250 | 55 | 78 | 51 | 40 |
| 1-(carbethoxymethyl)dichloroglycoluril | 100 | 47 | 15 | 48 | 10 |
| Bis(carboxymethyl)glycoluril | 100 | 81 | 83 | 48 | 51 |

EXAMPLE XI

To illustrate the efficiency of diethyl tetrachloroglycoluril-3a,6a-dicarboxylate as a bactericide and sanitizer, the procedure of Example X is followed and the following results are obtained.

| Dosage in p.p.m. | Percent control | | | |
|---|---|---|---|---|
| | *E.a.* | *X.p.* | *M.a.* | *E.c.* |
| 100 | 100 | 100 | 100 | 100 |
| 1 | 100 | 100 | 100 | 100 |
| 0.25 | 37 | 32 | 42 | 60 |

EXAMPLE XII

Fourth instar larvae of the Mexican bean beetle, *Epilachna varivestis,* less than one day old within the instar, are employed. Paired seed leaves, excised from Tendergreen bean plants, are dipped in a formulation of the test compound (2000 p.p.m. of 1-(carboxymethyl) glycoluril—5% acetone—0.01% Triton X–155—balance water) until they are thoroughly wetted. The chemical deposit on the leaf is then dried and the paired leaves are separated. Each is placed in a 9 cm. Petri dish with a filter paper liner, and ten randomly selected larvae are introduced before the dish is closed. After three days exposure, 65% mortality is observed.

EXAMPLE XIII

*Foliage protectant and eradicant tests*

The tomato foliage disease test measures the ability of the test compound to protect tomato foliage against infection by the early blight fungus *Alternaria solani* (Ell. and Mart.) Jones and Grout and the late blight fungus *Phytophthora infestans* (Mont.) De Bary. Results from this test indicate whether a compound may have practical use as a foliage protectant fungicide. The method used is a modification of that described by McCallan and Wellman and employs tomato plants (var. Bonny Best) five to seven inches high which are four to six weeks old. Duplicate plants, one set for each test fungus, are sprayed with various dosages of a formulation containing 0.4 g. of the test compound, 8 ml. acetone, 4 ml. stock emulsifier solution (6.5% Triton X–155 by volume) and 187.6 ml. distilled water at 40 pounds air pressure while being rotated on a turntable in a hood. The center of the turntable is 45 inches from the nozzle of the spray gun.

After the spray deposit is dry, treated plants and controls (sprayed with formulation less toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight to permit spore germination and infection before removal to the greenhouse.

After two days from the start of the test for early blight and three days for late blight, lesion counts are made on the three uppermost fully expanded leaves. The data are converted to percentage disease control based on the number of lesions obtained on the control plants. Dosages and percent disease control are given in Table II.

TABLE II

| Compound | Early blight | | Late blight | |
|---|---|---|---|---|
| | Dosage in p.p.m. | Percent control | Dosage in p.p.m. | Percent control |
| 1-(carboxymethyl)glycoluril | 400 | 49 | | |
| 1-(carbethoxymethyl)dichloroglycoluril | 2,000 | 83 | | |
| Diethyl tetrachloroglycoluril-3a,6a-dicarboxylate | 64 | 45 | 256 | 77 |
| Sodium salt of 1-(carboxymethyl)-trichloroglycoluril | 400 | 72 | 400 | 56 |

EXAMPLE XIV

Pinto bean plants at a growth stage where the trifoliate leaves are just beginning to emerge from the axle of the seed leaves are used for the test species. These plants are grown in 4-inch pots and thinned to 3 plants per pot. Usually the plants are about 10 to 14 days old from time of planting. There are, therefore, 6 primary seed leaves per pot for each test unit. Twenty-eight ml. of a basic formulation containing 0.4 g. of 1-(carbethoxymethyl)dichloroglycoluril, 8 ml. acetone, 4 ml. stock emulsifier solution (0.5% Triton X–155 by volume) and 187.6 ml. distilled water are drenched on each pot which is equivalent to 56 mg. of chemical or 64 pounds per acre. About 2 or 3 hours after treatment a spore suspension of bean rust is applied to the bean leaves by spraying the plants while they are being rotated on a turntable as in Example XIII. After exposure, plants are immediately placed in a moist chamber in a saturated atmosphere at 60° F. for 24 hours, after which they are removed to the greenhouse. The rust spore suspension is prepared with one part of rust spores, 16 parts of talc and 26,000 parts of water. Counts are made about 10 days after spore exposure and a mean number of rust postules per leaf is determined. These counts are calculated against the check counts to arrive at the percentage disease control. The compound 1-(carbethoxymethyl)dichloroglycoluril provides 91% disease control.

EXAMPLE XV

Soil known to be infested with seed decay and damping off fungi is placed in 4 x 4 x 3-inch plant band boxes and treatment is accomplished by drenching the soil with 74.25 ml. of a formulation containing 0.4 ml. of test compound, 8 ml. of acetone, 4 ml. stock emulsifier solution (0.5% Triton X-155 by volume) and 187.6 ml. distilled water (148.5 mg. of active chemical). The plant band boxes have a surface area of 16 sq. in. and 1.16 mg. equal to 1 pound per acre. One day after treatment, the soil is removed from each box and thoroughly mixed in a 5-pound paper bag and then replaced in the box. Three days after drenching, 25 seed peas (var. Perfection) are planted in each box. From the time of treatment until the pea seeds begin to emerge the boxes are held at 20° C. in a controlled temperature cabinet. Untreated checks and a standard material are included in each test in addition to a check planted in sterilized soil. After seed emergence, the box is removed to the greenhouse and percentage stand is recorded 14 days after planting. The compound 1-(carbethoxymethyl)dichloroglycoluril, at a dosage of 128 pounds per acre, provides 52% stand of the test plant.

EXAMPLE XVI

One week after a drench treatment of tomato plants, 2 to 3 weeks old, growing in 4-inch clay pots, they are exposed to the early blight fungus in the same manner as described for the bean rust in Example XIV. After 48 hours lesion counts are made and converted to percent disease control based on check plants. Lesion counts are made and converted to percent disease control based on check plants. The amount of chemical applied is 28 ml. of the basic formulation of Example XIV which is equivalent to 56 mg. or 64 pounds per acre. The compound 1-(carbethoxymethyl)dichloroglycoluril exhibits 42% control.

It is to be understood that although the invention has been described with specific reference to particular embodiments thereof, it is not to be so limited, since changes and alterations therein may be made which are within the full intended scope of this invention as defined by the appended claims.

What is claimed is:

1. A polysubstituted glycoluril of the structure:

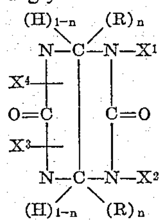

wherein R is selected from the group consisting of $COOC_2H_5$ and COONa; $X^1$ is selected from the group consisting of chlorine, $CH_2COOH$, $CH_2COOC_2H_5$ and $CH_2COONa$; $X^2$ is selected from the group consisting of H and chlorine; $X^3$ and $X^4$ are selected from the group consisting of H, chlorine and $CH_2COOH$; and $n$ is a number from 0 to 1, inclusive, with $n$ being 1 when $X^1$ is chlorine and being 0 when $X^1$ is other than chlorine.

2. Disodium tetrachloroglycoluril-3a,6a-dicarboxylate.

3. Diethyl tetrachloroglycoluril-3a,6a-dicarboxylate.

4. 1-(carboxymethyl)glycoluril.

5. 1-(carboxymethyl)trichloroglycoluril.

6. Sodium salt of 1-(carboxymethyl)trichloroglycoluril.

7. 1-(carbethoxymethyl)glycoluril.

8. The method of preparing carboxymethyl substituted glycolurils which comprises reacting a material selected from the group consisting of glyoxal and glyoxalmonoureide with a material selected from the group consisting of hydantoic acid and ethyl hydantoate in an aqueous acid solution.

9. The method of preparing 1-(carboxymethyl)glycoluril which comprises reacting glyoxalmonoureide with hydantoic acid in an aqueous acid medium.

10. The method of preparing bis(carboxymethyl)glycoluril which comprises reacting glyoxal and hydantoic acid in an aqueous acid medium.

References Cited by the Examiner

UNITED STATES PATENTS

| | | | |
|---|---|---|---|
| 2,459,817 | 1/49 | Harris et al. | 260—309.7 |
| 2,633,469 | 3/53 | Adkins et al. | 260—309.7 |
| 2,649,389 | 8/53 | Williams | 117—121 |
| 2,654,763 | 10/53 | Adkins | 260—309.7 |
| 2,697,714 | 12/54 | Goodman | 260—309.7 |
| 2,777,856 | 1/57 | Stokes | 260—309.7 |
| 2,863,800 | 12/58 | Gottfried | 167—33 |
| 2,920,997 | 1/60 | Wolf et al. | 167—33 |
| 3,019,160 | 1/62 | Slezak et al. | 260—309.7 |

OTHER REFERENCES

Weygand: Organic Preparations, pp. 170–75, N.Y., Interscience, 1945.

IRVING MARCUS, *Primary Examiner.*

M. O. WOLK, WALTER A. MODANCE, *Examiners.*